(12) United States Patent
Mason et al.

(10) Patent No.: US 6,824,496 B2
(45) Date of Patent: Nov. 30, 2004

(54) FLOATING CONE CONTINUOUSLY VARIABLE TRANSMISSION

(75) Inventors: Paul J. Mason, Battle Creek, MI (US); Mark A. Kanouse, Schoolcraft, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/029,084

(22) Filed: Dec. 21, 2001

(65) Prior Publication Data

US 2003/0119624 A1 Jun. 26, 2003

(51) Int. Cl.[7] .............................................. F16H 15/20
(52) U.S. Cl. ........................................ 476/51; 476/50
(58) Field of Search ................................ 476/31, 50, 51

(56) References Cited

U.S. PATENT DOCUMENTS

| | | | | |
|---|---|---|---|---|
| 875,962 A | * | 1/1908 | Stanley | 476/31 |
| 1,050,351 A | * | 1/1913 | Dean | 476/31 |
| 1,459,979 A | * | 6/1923 | Kohn | 476/31 |
| 3,302,474 A | * | 2/1967 | Edlich | 475/216 |
| 5,601,509 A | | 2/1997 | Munoz | |
| 6,092,432 A | | 7/2000 | Klaricic | |
| 6,174,260 B1 | * | 1/2001 | Tsukada et al. | 476/50 |

OTHER PUBLICATIONS

Article entitled "Nissan's Extroid CVT", by Jack Yamaguchi, Automotive Engineering International/Feb. 2000.

* cited by examiner

Primary Examiner—William C. Joyce
(74) Attorney, Agent, or Firm—Rader, Fishman & Grauer PLLC

(57) ABSTRACT

A continuously variable transmission (CVT) is suitable for replacement of a main transmission box of a compound transmission in a light to medium duty electromechanically actuated truck transmission system. For example, one line-haul truck transmission consists of a five-speed main section and an auxiliary deep reduction box to provide 15 forward speed ratios. The replacement of the five-speed main section with a CVT unit enhances the overall operating efficiency of the system. In one form, the CVT includes a pair of rotatable countershafts mounted to pivot relative to one another. Each of countershafts has a greater diameter disk at one end than the other. Positioned between countershafts are a pair of laterally spaced cones that share a common axis; the greater diameter disk ends of the two countershafts bear against one of the intermediately positioned cones, while smaller diameter disk ends of the countershafts bear against the second cone.

3 Claims, 3 Drawing Sheets

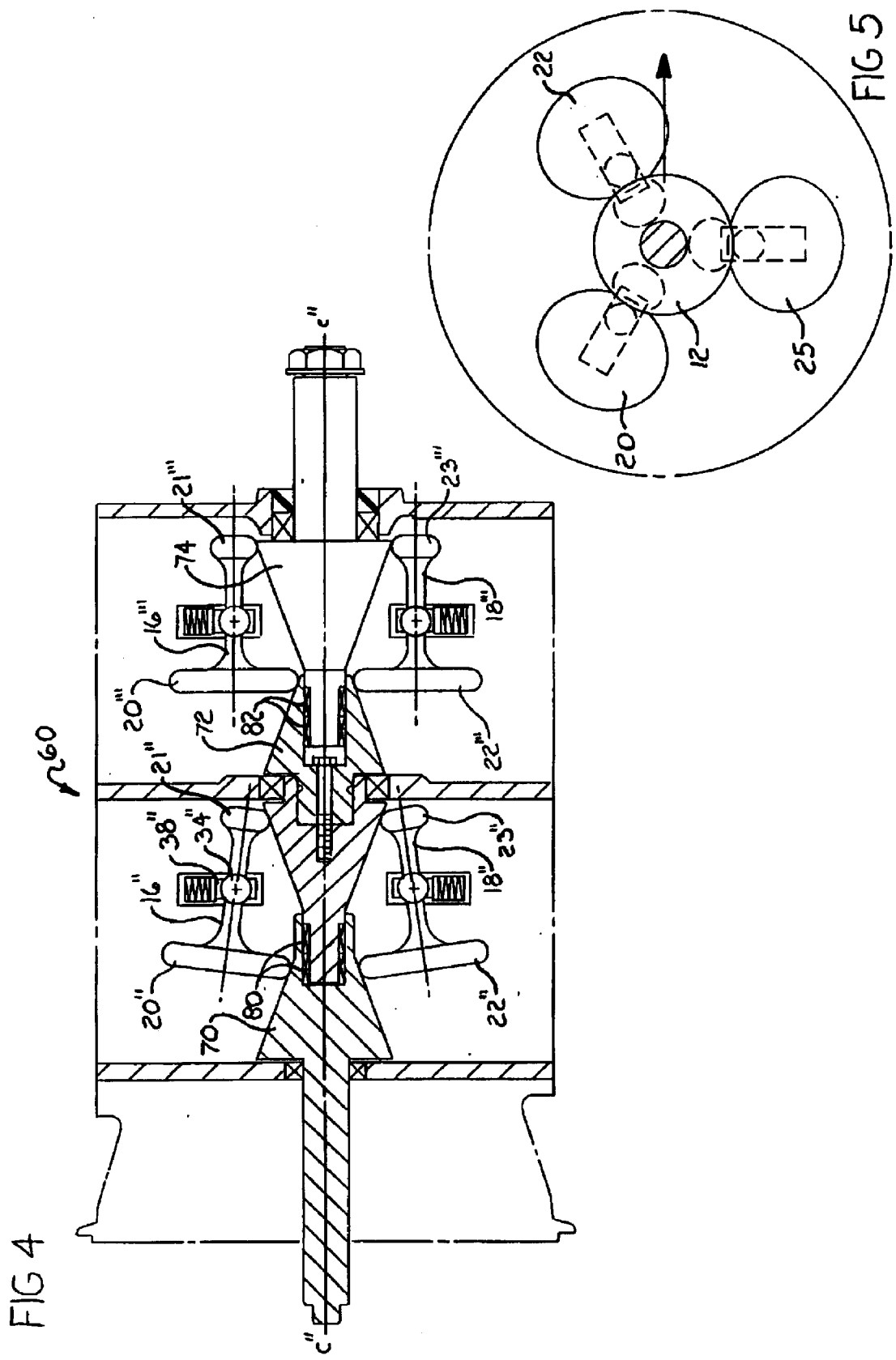

FLOATING CONE CONTINUOUSLY VARIABLE TRANSMISSION

BACKGROUND OF THE INVENTION

1. Field of Invention

This invention relates generally to improvements in continuously variable transmissions (CVTs) employed in vehicular applications. More particularly, the invention relates to an improved CVT that offers considerably reduced structural complexity compared to typical toroidal types of CVTs.

2. Description of the Prior Art

Automatically actuated electromechanical transmissions include actuation software modules of the embedded type, generally including connection links to engine control modules through standardized protocols. To the extent that the most new on-highway truck transmissions are actuated and controlled by software, they lend themselves to fully automated controls. As such, there has been considerable interest in providing CVT-like operating systems in trucks, motivated substantially by desire for improved economy of operation.

U.S. Pat. No. 6,085,606 issued Jul. 11, 2000 to Stine et al. provides an example of one such CVT-like transmission. That patent describes a 12-speed transmission which, although including gears, provides relatively small steps between the ratios of its highest ratio gears, gears 7–12, compared to the ratio steps between its lowest gears, 1–6. Thus, in its highest gear ratios, the behavior of the transmission approximates an actual CVT. Indeed, to the extent that on-highway trucks spend approximately 85–90 percent of their operating lives in their highest gear ratios, such accommodation involving only the highest gears has been deemed to be a suitable relatively inexpensive approach, though of course more limited than an actual CVT.

Thus, use of a CVT-like or "mock CVT" approach has been acceptable in that it generates significant benefits in fuel economy, while traditionally considerably cheaper to manufacture than significantly more expensive full CVT transmissions. Indeed, the presently emerging belt-type and toroidal CVT transmissions, even at today's levels of technology and development, are believed to be insufficient to accommodate and/or transmit the relatively high torques associated with on-highway trucks. Thus, a full, actual CVT transmission for trucks that could be manufactured relatively inexpensively, and that could operationally meet required torque demands, would be well received, particularly among truck fleet owners.

SUMMARY OF THE INVENTION

A rotary cone-type continuously variable transmission (CVT) incorporates at least a pair of countershafts that are relatively rotatable within a transmission housing. The CVT is both beltless and non-toroidal, and includes at least two countershafts mounted within the housing in a manner so as to support controlled limited axial and pivotal movements thereof relative to the housing as well as to one another.

The axially translatable ends of each of the countershafts are entirely contained within the housing, and a first end of each countershaft has a greater diameter than its second end. A pair of axially spaced, radially floating transmission input and output cones is rotatably positioned within the housing along a shared longitudinal axis, the respective cones being arranged to rotate independently of each other while being axially fixed relative to one another between the at least two countershafts.

In the described embodiment, the greater diameter first ends of the two countershafts are defined by disks designed to bear against and to make rolling contact with one (the input) of the radially intermediately positioned cones, while the smaller second ends of the two countershafts are defined by smaller disks designed to bear against and make rolling contact with the second (output) cone.

The CVT as disclosed is deemed suitable for economical replacement of geared electromechanically actuated main transmission boxes of compound transmissions in at least medium duty truck transmission systems. As an example, one line-haul truck transmission consists of a five-speed main box and a separate auxiliary five-speed deep reduction box to provide 15 forward speed ratios. The replacement of the five-speed main box with the CVT unit of this invention would significantly enhance overall operating efficiency of the described 15-speed system.

BRIEF DESCRIPTION OF THE DRAWINGS

FIG. 4 is a cross-sectional view of a second alternate, i.e., a compound embodiment, of a CVT unit constructed in accordance with the present invention.

FIG. 5 is a cross-sectional view of a third alternate embodiment of a CVT unit constructed in accordance with the present invention from a perspective taken along lines 5—5 of FIG. 1.

DETAILED DESCRIPTION OF THE EMBODIMENTS

Figure 1:
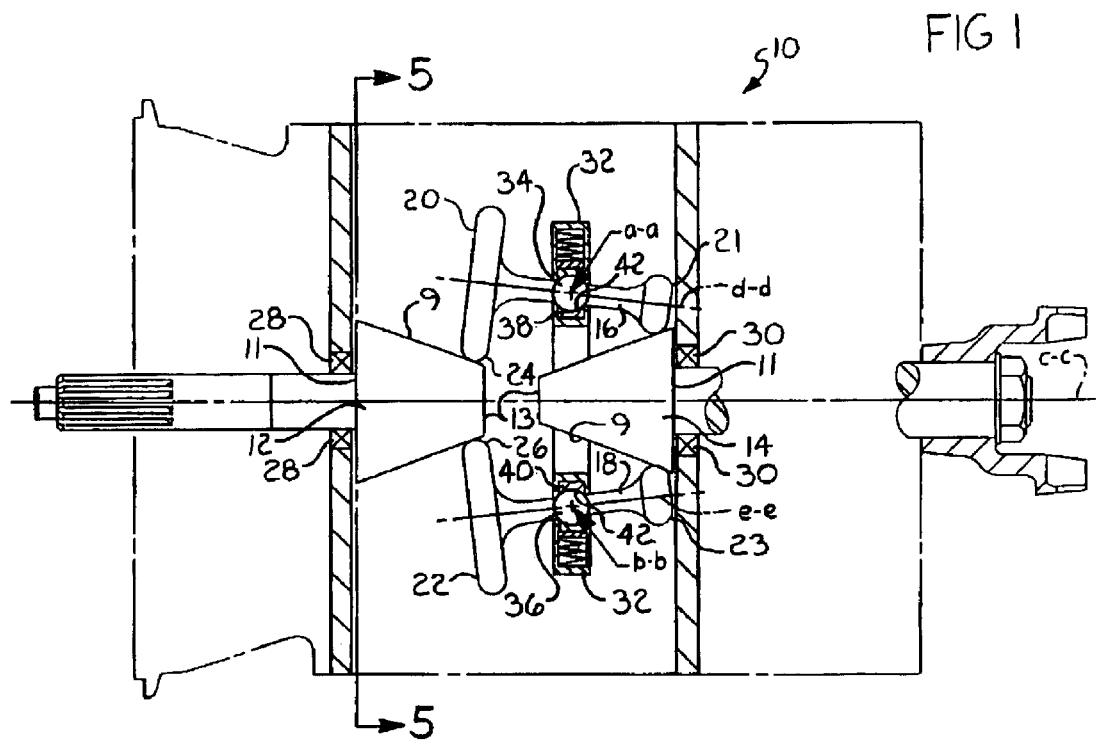
FIG. 1 is a cross-sectional view of a CVT unit constructed in accordance with the present invention, shown in a low-speed position.

Referring initially to FIG. 1, a novel cone-style CVT system 10 designed for use in a power train of a motor vehicle (neither shown) is both beltless and non-toroidal. The specific configuration of the CVT system 10 is particularly suitable for on-highway trucks, although the invention is broad enough to apply to other vehicular platforms as well.

A front input cone 12 has a frustoconical cross-section as shown; a rear output cone 14 also shares a reversely oriented but otherwise identical frustoconical cross-section. Each of the cones 12, 14 includes a conical surface 9, a major circular base 11, and a smaller minor circular base 13. The cones are arranged in a manner such that their smaller circle bases 13 are positioned proximally to one another, while their larger major circle bases 11 are opposed to one another and define spaced extremities of the cones.

The cones are positioned so as to lie spatially apart along a common horizontal axis c—c, and are axially fixed relative to one another along the axis c—c. At least a pair of countershafts 16 and 18 is adapted to swivel about a pair of parallel vertical axes, shown as a—a and b—b, respectively.

The two countershafts 16, 18 are also supported for limited axially translational movements of their pivotally moveable shaft axes d—d and e—e, respectively. As such, each countershaft is adapted to be controllably moved both pivotally and translationally along the axis c—c, and relative to the cones 12, 14, which rotate on thrust bearings 28, 30, respectively, against housing ends (not shown).

Each countershaft 16, 18 includes a disk 20, 22, respectively, and each disk is rigidly secured to its respective shaft. Each disk is adapted to controllably engage various axially extending portions of the conical surface 9 of the input cone 12 so as to provide infinitely variable gearing ratios between a pair of lowest and highest design CVT input-output ratios.

The countershafts 16, 18 are supported for pivotal and translational movement in trunnions 32 that are supported in a CVT housing 100 (FIG. 6), as will be appreciated by those skilled in the art. The trunnions 32 support ball bearings 34, 36, rigidly secured to each shaft 16, 18, respectively, and permit relative movement of the bearings 34, 36 in spherical race surfaces 42 of bearing races 38 and 40, respectively.

As depicted in FIG. 1, the CVT system 10 is shown in its lowest speed position. It will be appreciated that the larger diameter disks 20, 22 secured to shafts 16, 18, respectively, have edges 24, 26 adapted to engage spaced apart conical surfaces 9 of the front input cone 12. Conversely, the opposed small diameter disks 21, 23 of the shafts 16, 18 are adapted to engage spaced surfaces 9 of the rear output cone 14. It will be apparent to those skilled in the art that the cones 12, 14 remain fixed along the axis c—c, while the shafts 16, 18, along with the disks 20, 22, 21, 23 fixed thereto, will pivot as well as move translationally by means of software controlled axial movements (i.e. along axis c—c) of the trunnions 32, which in the as described embodiment are adapted to move uniformly together, though spaced apart from one another, as shown.

Figure 2:
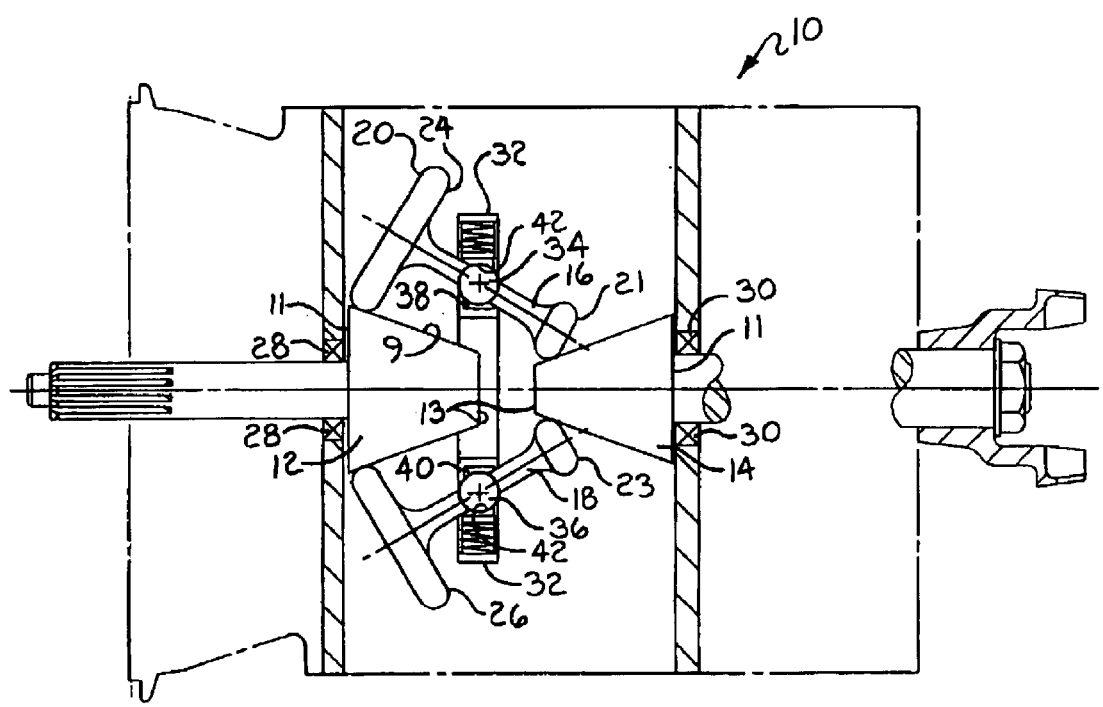
FIG. 2 is a cross-sectional view of the embodiment of the CVT unit of FIG. 1, shown in a high-speed position.

Referring now also to FIG. 2, the CVT system 10 of FIG. 1 is shown in its highest speed position, wherein the system 10 would be operating under its relatively lowest power position, such as would be encountered in a vehicle operating at its upper range of highway speeds. Finally, those skilled in the art will appreciate that the use of three uniformly circumferentially spaced shafts (described herein below in an alternate embodiment) of the type 16, 18 and associated disks 20, 22, 21, 23 will facilitate centering, hence "floating", of the cones 12, 14, as the cones tend to seek operating positions of lowest stress under normal loads.

Figure 3:
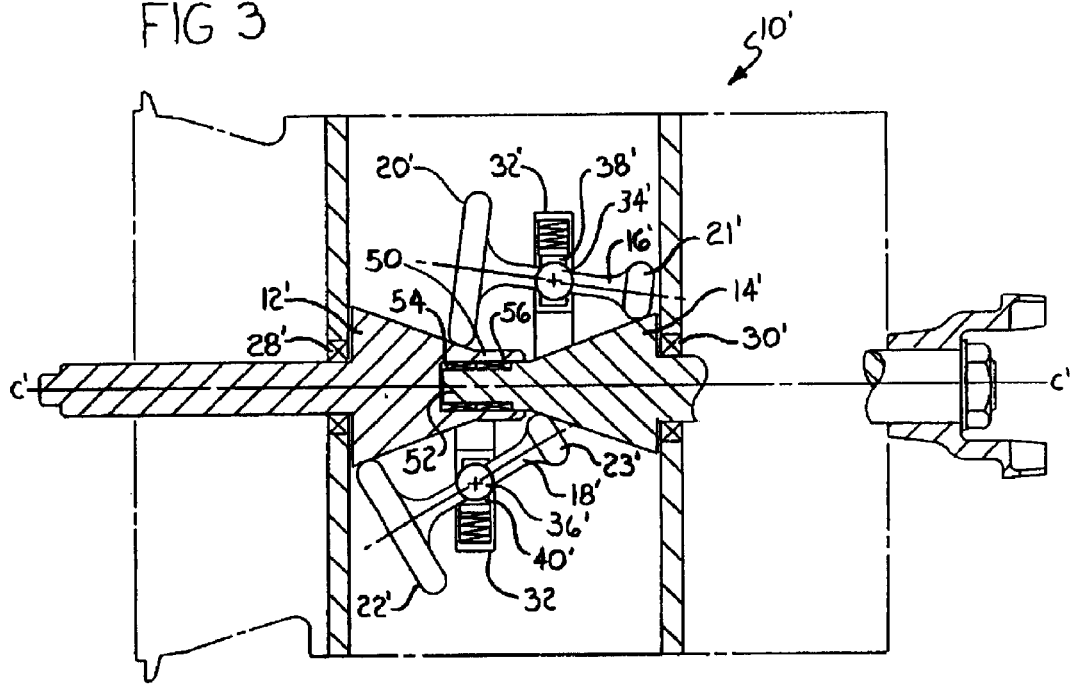
FIG. 3 is a cross-sectional view of a first alternate embodiment of a CVT unit constructed in accordance with the present invention, shown with top and bottom views split to separately demonstrate low-speed and high-speed positions.

Referring now to FIG. 3, an alternate CVT system 10' depicts a special structure for fixing cones 12' and 14' positioned along a common axis c'—c'. Thus, an outer tube shaft 50 supports the cone 14' which is rigidly secured thereto, as shown. A stepped diameter inner tube shaft 52, i.e., having multiple diameters as also shown, provides a support shaft for the input cone 12' positioned oppositely of the output cone 14' situated at the second end of the CVT structure 10'. The respective tube shafts 50, 52 are supported on plurality of spaced pilot bearings 54, 56, as depicted.

Finally, similar to the embodiment of FIGS. 1 and 2, the disks 20' and 21' of FIG. 3 are shown to be integrally formed with the shaft 16'. Similarly, the disks 22' and 23' are integrally formed with their associated shaft 18'. The integral formation of disk and countershaft parts can be achieved by a forging process. Such a forging process offers assurance that the neither of the disks 20', 22', 21', 23' will rotate or slip relative to its respective shaft 16', 18' under the relatively high loading forces associated with CVT transmissions.

Referring now to FIG. 4, a second alternate tandem CVT arrangement 60 comprises a CVT system having a first input cone 70. A spatially positioned second, intermediate, compound cone 72 shares axis c"—c" with the first cone 70 through a set of spacer pilot bearings 80. Finally a third cone 74 is axially juxtaposed against the second cone 72 through a second set of spacer pilot bearings 82. This arrangement provides a multiplier effect of the ratios of first and second cones to provide a considerably wider range between a lowest available design CVT ratio and highest available design CVT ratio, as will be readily apparent to those skilled in the art.

Finally, with respect to the tandem CVT arrangement 60 of FIG. 4, it will be apparent that the disks 20", 22", 21", 23" are positioned on shafts 16", 18"similar to the embodiments previously described. Similarly, the disks 20''', 22''', 21''', 23''' in the rear CVT section are positioned on shafts 16''', 18''' in similar manner.

Referring now to FIG. 5, a view along lines 5—5 of the CVT system 10 of FIG. 1 has been modified to demonstrate use of an extra disk 25 in a triple countershaft arrangement of a fourth alternate embodiment. (The first embodiment, i.e. that displayed in FIG. 1, only employed a twin countershaft structure.) The use of a third or even fourth countershaft may be appropriate to more uniformly distribute high loading within the CVT structure; i.e., to avoid highly concentrated loading in more robust, highly loaded, arrangements. Thus, depending on the power demands of a given transmission, particularly in view of engine size, etc., the number of countershafts can be increased, although obviously with a commensurate increase in cost.

Figure 6:
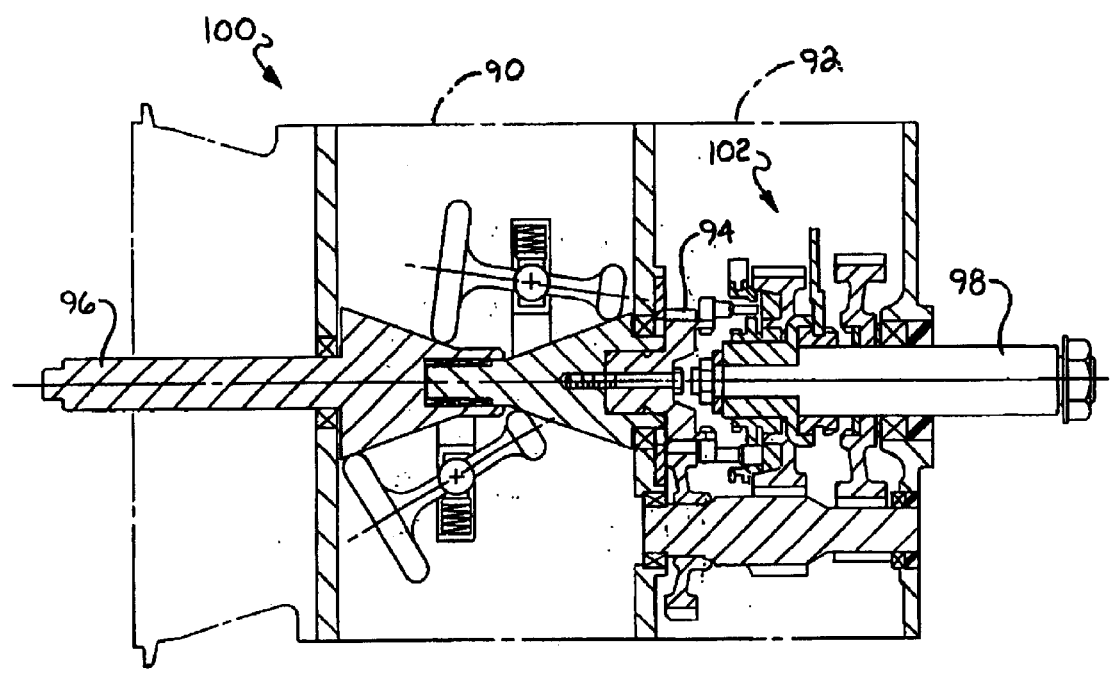
FIG. 6 is a cross-sectional view of a CVT unit constructed in accordance with the present invention, shown in a truck transmission compound box system, wherein the CVT unit is the front main box of a system that includes a rear deep reduction box.

Finally, a novel combination transmission system 100 is comprised of a front or main transmission box 90 coupled via an inter-shaft yoke 94 to a separate deep reduction box 92, as shown in FIG. 6. The deep reduction box contains appropriate gearing 102, as will be appreciated by those skilled in the art. Such an arrangement is typically employed in line-haul trucks as well as off-highway vehicles. A transmission input shaft 96 that extends from the front of the box 90 is driven by an engine through a clutch (neither shown), and operatively rotates a driveshaft 98 through the boxes 90 and 92. It will be apparent to those skilled in the art that the nature of bearing loads realized in a tandem box arrangement would be such that it would be expedient to provide the main transmission box 90 as a CVT, as depicted. In other words, the use of the main box 90 as the CVT would effectively keep such stresses to a minimum.

In such a case, the simple CVT system 10 of FIGS. 1 and 2, or the CVT system 10' of FIG. 3, would be appropriate, rather than use of the compound CVT 60 of FIG. 4. This is because the deep reduction box 92 supplies the noted multiplier effect described above with respect to the compound CVT 60. In summary, the box 92 will therefore operate to further expand the operating range points of the infinitely variable ratio provided by the CVT box 90.

It is to be understood that the above description is intended to be illustrative and not limiting. Many embodiments will be apparent to those skilled in the art upon reading the above description. The scope of the invention should be determined, however, not with reference to the above description, but with reference to the appended claims with full scope of equivalents to which such claims are entitled.

What is claimed is:

1. A continuously variable transmission comprising a housing, a pair of axially spaced cones rotatably arranged on a shared longitudinal axis of said housing, a pair of spaced apart countershafts relatively rotatable within said housing, said countershafts being mounted within said housing for limited, controlled movement therein, wherein each of said countershafts is adapted to be angularly pivoted within said housing and relative to one another, while axially translatable within said housing; each of said countershafts having defined first and second ends contained within said housing, wherein said first end of each countershaft has a greater diameter than said second end; said cones being positioned laterally intermediately between said countershafts; wherein the greater diameter first ends of said two countershafts are adapted to bear against and make rolling contact with one of said intermediately positioned cones, while said smaller diameter second ends of said two countershafts are adapted to bear against and make rolling contact with said second cone; and wherein an outer tube shaft supports one of said cones rigidly secured thereto, and a stepped diameter inner tube shaft supports the second of said cones, each respective shaft supported on a plurality of spaced pilot bearings disposed between the inner periphery of said outer shaft and the outer periphery of said inner shaft, and within said outer tube shaft.

2. A continuously variable transmission comprising a housing, a pair of axially spaced cones rotatably arranged on a shared longitudinal axis of said housing, a pair of spaced apart countershafts relatively rotatable within said housing, said countershafts being mounted within said housing for limited, controlled movement therein, wherein each of said countershafts is adapted to be angularly pivoted within said housing and relative to one another, while axially translatable within said housing; each of said countershafts having defined first and second ends contained within said housing, wherein said first end of each countershaft has a greater diameter than said second end; said cones being positioned laterally intermediately between said countershafts; wherein the greater diameter first ends of said two countershafts are adapted to bear against and make rolling contact with one of said intermediately positioned cones, while said smaller diameter second ends of said two countershafts are adapted to bear against and make rolling contact with said second cone: each of said countershafts adapted to be controllably moved both pivotally and translationally along separate but parallel axes for movement relative to said front input and rear output canes, wherein the larger major circle bases of said cones are supported by and rotate on thrust bearings; each of said countershafts includes a disk, respectively, that is rigidly secured to its respective shaft to define said first end of each countershaft having a greater diameter than said second smaller diameter end, each disk adapted to controllably engage various axially extending portions of the conical surface of said front input cone so as to provide infinitely variable gearing ratios between lowest and highest CVT input-output ratios; said opposed second smaller diameter end of each of said countershafts adapted to controllably engage various axially extending portions of the conical surface of said rear output cone so as to provide infinitely variable gearing ratios between lowest and highest CVT input-output ratios; said countershafts supported in trunnions for said pivotal and translational movements with respect to said housing, wherein said trunnions are supported in bearings rigidly secured to each countershaft, and wherein said bearings are supported for movement in spherical surfaces of bearing races fixed to said housing; said spaced apart countershafts and said disks fixed thereto and adapted to pivot and move translationally along said longitudinal axis by means of software controlled axial movements of said trunnions, wherein said trunnions are thereby moved uniformly together both pivotally and translationally; and further comprising an outer tube shaft supporting one of said cones rigidly secured thereto, and a stepped diameter inner shaft supporting the second of said cones, wherein each respective shaft is supported on a plurality of spaced pilot bearings disposed between the inner periphery of said outer shaft and the outer periphery of said inner shaft, and within said outer tube shaft.

3. A continuously variable transmission comprising a housing, a pair of axially spaced cones rotatably arranged on a shared longitudinal axis of said housing, a pair of spaced apart countershafts relatively rotatable within said housing, said countershafts being mounted within said housing for limited, controlled movement therein, wherein each of said countershafts is adapted to be angularly pivoted within said housing and relative to one another, while axially translatable within said housing; each of said countershafts having defined first and second ends contained within said housing, wherein said first end of each countershaft has a greater diameter than said second end; said cones being positioned laterally intermediately between said countershafts;

wherein the greater diameter first ends of said two countershafts are adapted to bear against and make rolling contact with one of said intermediately positioned cones, while said smaller diameter second ends of said two countershafts are adapted to bear against and make rolling contact with said second cone;

wherein said first cone is a front transmission input cone, and wherein said second cone is a rear output cone; said cones having reversely oriented frustoconical cross-sections, each of said cones comprising a conical surface, a major circular base, and a smaller minor circular base, wherein said cones are positioned along said longitudinal axis in a manner such that their smaller circle bases are positioned proximally to one another, while their larger major circle bases are opposed to one another and define spaced extremities of said cones;

wherein each of said countershafts is adapted to be controllably moved both pivotally and translationally along separate but parallel axes for movement relative to said front input and rear output cones, and wherein the larger major circle bases of said cones are supported by and rotate on thrust bearings;

wherein each of said countershafts includes a disk respectively, wherein each disk is rigidly secured to its respective shaft to define said first end of each countershaft having a greater diameter than said second smaller diameter end, and wherein each disk is adapted to controllably engage various axially extending portions of the conical surface of said front input cone so as to provide infinitely variable gearing ratios between lowest and highest CVT input-output ratios;

wherein said countershafts are supported in trunnions for said pivotal and translational movements with respect to said housing, wherein said trunnions are supported in bearings rigidly secured to each countershaft, and wherein said bearings are supported for movement in spherical surfaces of bearing races fixed to said housing;

wherein said opposed second smaller diameter end of each of said countershafts is adapted to controllably engage various axially extending portions of the conical surface of said rear output cone so as to provide infinitely variable gearing ratios between lowest and highest CVT input-output ratios;

wherein said spaced apart countershafts and said disks fixed thereto and adapted to pivot and move translationally along said longitudinal axis, are adapted to do so by means of software controlled axial movements of said trunnions, wherein said trunnions are thereby moved uniformly together both pivotally and translationally; and further comprising an outer tube shaft supporting one of said cones rigidly secured thereto, and a stepped diameter tube shaft supporting the second of said cones, wherein each respective shaft is supported on a plurality of spaced pilot bearings disposed between the inner periphery of said outer shaft and the outer periphery of said inner shaft, and within said outer tube shaft.

\* \* \* \* \*

UNITED STATES PATENT AND TRADEMARK OFFICE
CERTIFICATE OF CORRECTION

PATENT NO. : 6,824,496 B2
DATED : November 30, 2004
INVENTOR(S) : Paul J. Mason et al.

It is certified that error appears in the above-identified patent and that said Letters Patent is hereby corrected as shown below:

Column 5,
Line 19, delete "tube" before "shaft"

Signed and Sealed this

Thirty-first Day of May, 2005

JON W. DUDAS
*Director of the United States Patent and Trademark Office*